May 2, 1944. A. H. THOMPSON 2,347,852
SELF-LOCKING NUT.
Filed Aug. 12, 1942
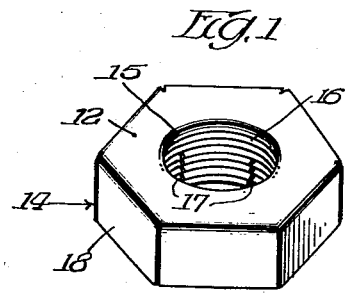
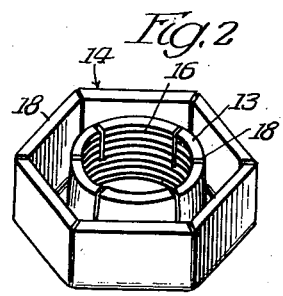
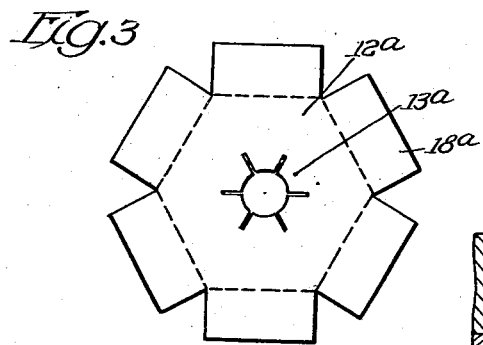
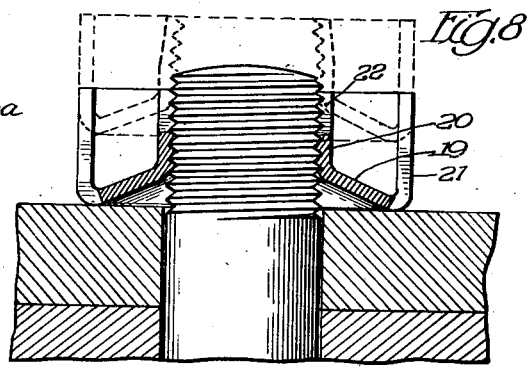
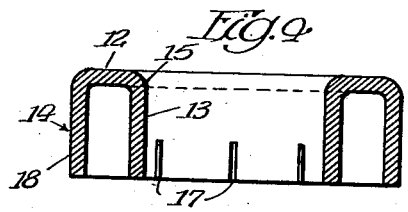
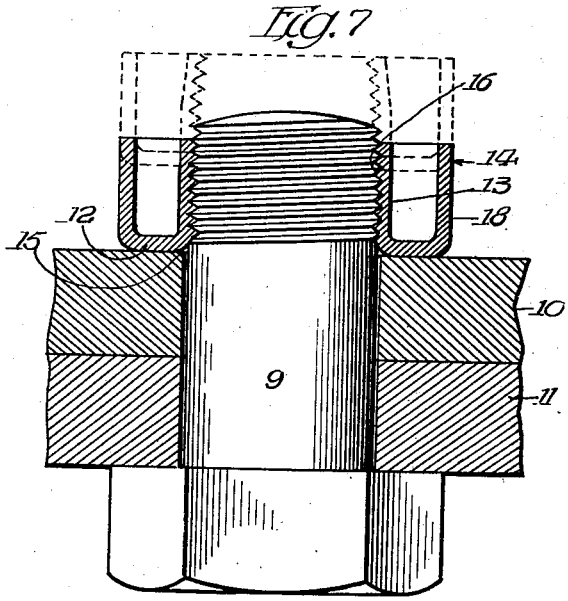
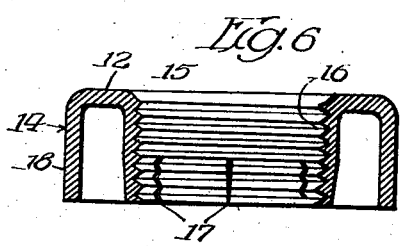
Inventor
Arthur H. Thompson
By Fred Gerlach
Atty Patented May 2, 1944

2,347,852

UNITED STATES PATENT OFFICE 2,347,852

SELF-LOCKING NUT

Arthur H. Thompson, Chicago, Ill., assignor to Thompson-Bremer & Co., Chicago, Ill., a corporation of Illinois Application August 12, 1942, Serial No. 454,525

5 Claims. (Cl. 151—14)

The present invention relates generally to self-locking nuts. More particularly the invention relates to that type of self-locking nut which is in the form of a one-piece spring metal stamping and comprises a flat centrally apertured polygonal body, a substantially cylindrical internally threaded sleeve which is joined to, and projects in one direction from the aperture defining portion of the body and is adapted in connection with use of the nut to be mounted on a threaded element, such as a screw or bolt, by turning the nut in the proper direction relatively to the element, and a flange structure which is joined to the outer marginal portions of the body, extends in the same direction as the sleeve, and forms around the sleeve a polygonal side wall whereby the nut may be gripped and turned by a wrench or like tool.

One object of the invention is to provide a self-locking nut of this type in which the outer or free end of the sleeve is provided with an annular series of laterally spaced longitudinally or axially extending notches and the portions of the sleeve between the notches are bent inwards to a slight extent so that they are collectively of less diameter than the unnotched inner end of the sleeve and hence grip with inward spring pressure the threaded element to which the nut is applied.

Another object of the invention is to provide a self-locking nut of the type and character under consideration which may be manufactured at an extremely low cost and is characterized by the fact that it is light in weight and is capable of withstanding a comparatively heavy load or clamping pressure.

Other objects of the invention and the various advantages and characteristics of the present self-locking nut will be apparent from a consideration of the following detailed description.

The invention consists in the several novel features which are hereinafter set forth and are more particularly defined by claims at the conclusion hereof.

In the drawing which accompanies and forms a part of the instant specification or disclosure and in which like numerals of reference denote corresponding parts throughout the several views:

Figure 1 is a bottom perspective of a self-locking nut embodying one form of the invention;

Figure 2 is a top perspective of the nut of Figure 1;

Figure 3 is a plan view of the spring steel blank from which the nut is made;

Figure 4 is a section showing the nut after shaping or processing of the blank to form the body, sleeve and side wall forming flanges;

Figure 5 is a section showing the nut after tapping of the inner periphery of the sleeve to form the internal screw thread;

Figure 6 is a section showing the nut in its finished form, that is, after the portions of the sleeve that are between the notches are bent or deflected inwards in order yieldingly to grip the element to which the nut is applied;

Figure 7 is a section showing the nut mounted in place on the threaded shank of a bolt; and Figure 8 is a section showing a nut embodying a second or modified form of the invention applied to a bolt.

The nut which is shown in Figures 1 to 7, inclusive, constitutes one form or embodiment of the invention. It has self-locking characteristics and is shown in Figure 7 in connection with a bolt 9 and a pair of abutting or superposed plates 10 and 11. The bolt exemplifies one type or form of externally threaded element on which the nut may be mounted. It is of conventional design and comprises an externally threaded shank and a polygonal head at one end of the shank. The shank of the bolt is illustrated as extending through aligned holes in the plates 10 and 11. It is also illustrated as being of such length that the end thereof that is opposite the head projects beyond the outer surface of the plate 10. The last mentioned plate constitutes the work, and the nut, when mounted on the shank of the bolt and tightened as hereinafter described, serves, in conjunction with the head of the bolt, to hold the plates 10 and 11 in clamped relation.

The nut under consideration is in the form of a one-piece stamping and is made from the blank that is shown in Figure 3. It is preferably made of comparatively thin spring steel stock and consists of a flat polygonal base or body 12, a cylindrical sleeve 13 and a side wall forming flange structure 14. The body 12 of the nut has a central circular aperture 15 and is illustrated as being hexagonal so far as its outer margin is concerned. The sleeve 13 is cylindrical and is joined to, and projects in one direction from, the aperture defining portion of the body 12. It is formed by a drawing or extruding operation, as hereinafter described, and has an internal screw thread 16 corresponding in pitch and diameter to the external thread on the shank of the bolt 9. As clearly illustrated in the drawing, this internal screw thread 16 consists of several convolutions with the result that the nut as a whole is capable of sustaining a comparatively heavy load or clamping pressure. When the nut is mounted on the externally threaded shank of the bolt and properly turned the sleeve 13 feeds onto the shank and becomes interlocked therewith. The nut is adapted is to be applied to the shank of the bolt in such manner that the sleeve 13 projects away from the work (see Figure 7). The outer or free end of the sleeve has formed therein an annular series of laterally spaced longitudinally or axially extending notches 17. These notches are preferably spaced equidistantly and are of uniform width from the inner ends thereof to the outer ends. The portions of the outer end of the sleeve that are separated or spaced apart by the notches are bent or deflected inwards, as shown in Figure 6, with the result that such portions are clearly of less diameter than the inner end of the sleeve and hence grip with inward pressure the bolt or other externally threaded element to which the nut is applied. The nut, when applied to the bolt 9, as shown in Figure 7, turns or rotates freely in the direction of the plate 10 constituting the work until the inwardly bent outer or free end portions of the sleeve come into contact with the end of the shank of the bolt. As soon as the nut is turned so as to engage the aforementioned portions of the sleeve with the bolt shank such portions, due to the fact that they are inwardly bent, grip the shank of the bolt with inward spring pressure. The nut is preferably applied by way of a wrench or like tool so that ready turning thereof may be effected. As the nut is turned into engagement or clamped relation with the work the outer end portions of the sleeve are urged outwards out of their normal inwardly bent position and the spring action which results causes such portions so to grip the shank of the bolt with inward pressure that the nut tends to remain in place. Because of the inherent resiliency of the outer free end portions of the sleeve 13 the nut may only be released from its operative position by applying a comparatively heavy reverse rotative force through the medium of a wrench or like tool. The inwardly bent outer end portions of the sleeve give the nut its self-locking property or characteristic. They are adapted to flex back into their normal inwardly bent position when the nut is removed from the bolt and serve, when the nut is in place on the bolt, to prevent loosening or rotative displacement thereof. The notches 17 are preferably six in number and are of such width that the outer or free end portions of the sleeve may be bent inwards to an appreciable extent.

The flange structure 14 consists of flanges 18 and these correspond in number to, and are associated respectively with, the outer marginal portions of the polygonal body 12. As best shown in Figures 1 and 2, the flanges 18 are joined to said marginal portions by right angle bends and extend in the same direction as the internally threaded substantially cylindrical sleeve 13. They surround and are spaced outwards of the sleeve and constitute a polygonal side wall whereby the nut may be gripped by a wrench or similar tool in connection with turning thereof. The ends of the flanges 18 constituting the flange structure 14 abut against one another and hence the flange structure as a whole is rigid and continuous in character. The flanges are the same in height and are so proportioned that the outer or free edges thereof are in a single plane and are substantially coplanar with the outer or free end edge of the sleeve 13. Preferably each flange 18 is truly parallel to the flange that is diametrically opposite it, and the notches 17 are positioned directly opposite the abutting ends of the flanges.

The blank from which the nut is formed is stamped from flat thin spring steel stock and, as shown in Figure 3, comprises an intermediate hexagonal body forming portion 12ᵃ, an inner centrally apertured sleeve forming portion 13ᵃ and outer flange forming portions 18ᵃ. After formation or stamping the blank is subjected to the action of a pair of coacting dies in order to extrude or draw the inner portion 13ᵃ and form the cylindrical sleeve 13. It is contemplated that the dies will simultaneously with the drawing of the inner portion 13ᵃ to form the sleeve 13 bend the outer flange portions 18ᵃ so as to form the flanges 18 constituting the flange structure 14. The notches 17 may be formed either at the time the blank is stamped or they may be formed in the outer or free end of the sleeve 13 after the inner portion 13ᵃ of the blank has been formed by die action into the sleeve 13. After the blank is subjected to the action of the dies the nut is in the form shown in Figure 4. At the completion of the die action the intermediate portion 12ᵃ of the blank forms the centrally apertured polygonal body 12. Following shaping of the blank the inner periphery of the sleeve 13 is tapped, as shown in Figure 5, to form the internal screw thread 16 corresponding in pitch and diameter to the external thread of the shank of the bolt. Thereafter the portions of the outer or free ends of the sleeve that are between the notches 17 are bent or deflected inwards, as shown in Figure 6. Inward bending of such portions of the outer end of the sleeve may be effected in any suitable manner, such, for example, as by a crimping or wedging die.

The nut which is shown in Figures 1 to 7, inclusive, is extremely light in weight and, as previously pointed out, is capable of sustaining or withstanding a comparatively heavy load or clamping pressure. It has special utility as a jam or lock nut and may be produced at a low cost because it is in the form of a one-piece stamping.

The nut which is shown in Figure 8 comprises a centrally apertured polygonal body 19, a substantially cylindrical sleeve 20 and a flange structure 21. It is the same as the nut of Figures 1 to 7, inclusive, except that the centrally apertured polygonal body 19, instead of being flat, is inwardly dished so that it is capable of flexing in an axial direction with respect to the sleeve 20. The sleeve is axially offset with respect to the outer polygonal margin of the body due to the inward dishing of the body. The outer or free end of the sleeve has formed therein longitudinally extending equidistantly spaced notches 22, and the portions of the outer end of the sleeve that are between the notches are inwardly bent so that they grip with inward spring pressure the threaded element to which the nut is applied. The nut is adapted to be applied or used as shown in Figure 8. When the nut is tightened after abutment of the outer marginal portion of the body against the work the sleeve 20 moves towards the work and relatively to the outer marginal portion of the body and causes the body so to flex toward the work that the outer marginal portion thereof grips the work with spring pressure and assists the outer end portions of the sleeve in resisting reverse rotation of the nut. Flexing of the body in connection with tightening of the nut is due to the fact that the body is inwardly dished and the inner end of the sleeve is inwardly offset with respect to the outer marginal portion of the body. The nut which is shown in Figure 8 is characterized by the fact that when it is fully tightened the outer marginal portion of the body grips the work with spring pressure and the outer end portions of the sleeve grip the threaded element with inward spring pressure. Because of the spring pressure grip of the outer marginal portion of the body of the nut against the work and the inward spring pressure grip of the outer ends of the sleeve with respect to the threaded element the nut is effectively retained in place and possesses so-called self-locking properties. The nut of Figure 8 is formed in the same manner as the nut of Figures 1 to 7, inclusive, with the exception that when the blank is subjected to the action of the coacting dies in order to form the sleeve and flange structure the body forming portion of the blank is deformed so that the body of the complete nut has the desired inward dish type contour.

The invention is not to be understood as restricted to the details set forth, since these may be modified within the scope of the appended claims, without departing from the spirit and scope of the invention.

Having thus described the invention what I claim and desire to secure by Letters Patent is:

1. As a new article of manufacture, a one-piece self-locking nut adapted to be mounted on an externally threaded element projecting through a work piece, formed of comparatively thin stamped spring metal, and comprising a body adapted to engage the work piece and having an aperture in the central portion thereof, a sleeve having an internal screwthread extending from one end thereof to the other, joined to, and extending in one direction from, the aperture defining portion of the body, adapted when the nut is mounted on the externally threaded element to surround and interfit with the thread of said element and extend away from the work piece, having longitudinal laterally spaced notches extending inwards from its outer or free end and terminating adjacent its central part, and also having the portions thereof between such notches bent inwards so that they grip the element with spring pressure, and a flange structure connected to the outer marginal portion of the body, extending in the same direction as the sleeve, and forming a side wall around and in spaced relation with the sleeve.

2. As a new article of manufacture, a one-piece self-locking nut adapted to be mounted on an externally threaded element projecting through a work piece, formed of a comparatively thin spring metal stamping, and comprising a polygonal body adapted to engage the work piece and having an aperture in the central portion thereof, a sleeve having an internal screw thread extending from one end thereof to the other, joined to, and extending in one direction from, the aperture defining portion of the body, adapted when the nut is mounted on the externally threaded element to surround and interfit with the thread of said element and extend away from the work piece, having longitudinal laterally spaced notches extending inwards from its outer or free end and terminating adjacent its central part, and having the portions thereof between such notches bent toward one another so that they grip the element with spring pressure, and a polygonal flange structure connected to the outer marginal portion of the body, extending in the same direction as the sleeve, having the outer edge thereof coplanar with the outer end edge of the sleeve, and forming a wrench-receiving side wall around and in spaced relation with the sleeve.

3. As a new article of manufacture, a one-piece self-locking nut adapted to be mounted on an externally threaded element projecting through a work piece, formed of a comparatively thin spring metal stamping, and comprising a polygonal body adapted to engage the work piece and having an aperture in the central portion thereof, a sleeve having an internal screw thread extending from one end thereof to the other, joined to, and extending in one direction from, the aperture defining portion of the body, adapted when the nut is mounted on the externally threaded element to surround and interfit with the thread of said element and extend away from said work piece, having longitudinal equidistantly spaced notches extending inwards from its outer or free end and terminating adjacent its central part, and in addition having the portions thereof between said notches bent inwards so that they grip the element with spring pressure, and a plurality of equal height flanges corresponding in number and connected, respectively, to the outer marginal portions of the body, having the adjacent end edges thereof in abutment and their outer edges coplanar with the outer end edge of the sleeve, extending in the same direction as the sleeve, and forming a polygonal wrench-receiving side wall around and in spaced relation with the sleeve.

4. As a new article of manufacture, a one-piece self-locking nut adapted to be mounted on an externally threaded element projecting from a work piece, formed of comparatively thin stamped spring metal, and comprising a body adapted to engage the work piece and having an aperture in the central portion thereof, a sleeve having an internal screw thread extending from one end thereof to the other, joined to, and extending in one direction from, the aperture defining portion of the body, adapted when the nut is mounted on the element to surround and interfit with said element and extend away from the work piece, having longitudinal laterally spaced notches extending inwards from its outer or free end and terminating adjacent its central part, and in addition having the portions thereof between said notches bent inwards so that they grip the element with spring pressure, and a flange structure connected to the outer marginal portion of the body, extending in the same direction as the sleeve, and forming a side wall around and in spaced relation with the sleeve, said body being inwardly dished and adapted when the nut is tightened after engagement of the outer marginal portion of the body with the work piece to flex in the direction of the work piece as a result of feed of the sleeve toward said work piece and relatively to the flange structure, and cause said outer marginal portion thereof to grip the work piece with spring pressure.

5. As a new article of manufacture, a one-piece self-locking nut adapted to be mounted on an externally threaded element projecting from a work piece, formed of a comparatively thin spring metal stamping, comprising a polygonal body adapted to engage the work piece and having a circular aperture in the central portion thereof, a substantially cylindrical sleeve having an internal screw thread extending from one end thereof to the other, joined to, and extending in one direction from, the aperture defining portion of the body, adapted when the nut is mounted on the element to surround and interfit with the thread of said element and extend away from the work piece, having longitudinal laterally spaced notches extending inwards from its outer or free end and terminating adjacent its central part, and in addition having the portions thereof between said notches bent inwards so that they grip the element with spring pressure, and a polygonal flange connected to the outer marginal portion of the body, extending in the same direction as the sleeve, and forming a side wall around, and in spaced relation with, the sleeve, said body being inwardly dished and adapted when the nut is tightened after engagement of the outer marginal portion of the body with the work piece to flex in the direction of the work piece as a result of feed of the sleeve toward said work piece and relatively to the flange structure, and cause said outer marginal portion thereof to grip the work piece with spring pressure.

ARTHUR H. THOMPSON.